United States Patent
Cortez Ruiz

(10) Patent No.: US 8,403,507 B2
(45) Date of Patent: Mar. 26, 2013

(54) REAR-VIEW MIRROR FOR IMPROVING A DRIVER'S VISION IN A CAR OR MOTOR VEHICLE

(76) Inventor: Lourdes Cortez Ruiz, Colonia Santa Ursula Xitla (MX)

( * ) Notice: Subject to any disclaimer, the term of this patent is extended or adjusted under 35 U.S.C. 154(b) by 0 days.

(21) Appl. No.: 12/440,437

(22) PCT Filed: Sep. 6, 2007

(86) PCT No.: PCT/MX2007/000107
§ 371 (c)(1),
(2), (4) Date: Mar. 6, 2009

(87) PCT Pub. No.: WO2008/030078
PCT Pub. Date: Mar. 13, 2008

(65) Prior Publication Data
US 2010/0177415 A1 Jul. 15, 2010

(30) Foreign Application Priority Data
Sep. 6, 2006 (IT) .............. LU2006U00004

(51) Int. Cl.
*G02B 7/182* (2006.01)
(52) U.S. Cl. ........................................ 359/871
(58) Field of Classification Search ........... 359/871–876
See application file for complete search history.

(56) References Cited

U.S. PATENT DOCUMENTS

| | | | |
|---|---|---|---|
| 4,832,476 A | 5/1989 | Gabrielyan | |
| 4,927,255 A * | 5/1990 | Martinez | 359/855 |
| 5,946,149 A * | 8/1999 | Hoffman | 359/854 |
| 5,946,150 A | 8/1999 | Liao | |
| 6,439,729 B2 * | 8/2002 | Koukichi | 359/854 |

FOREIGN PATENT DOCUMENTS

| | | |
|---|---|---|
| DE | 3502203 | 7/1986 |
| FR | 62366 | 6/1955 |
| FR | 1416590 | 11/1965 |
| FR | 2818212 | 6/2002 |

OTHER PUBLICATIONS

International Search Report for PCT/MX2007/000107 filed Sep. 6, 2007.

* cited by examiner

*Primary Examiner* — Euncha Cherry
(74) *Attorney, Agent, or Firm* — Baker & Hostetler, LLP

(57) ABSTRACT

The invention relates to a rear-view mirror for improving a driver's vision in a car or motor vehicle. As with standard rear-view mirrors, the inventive dual rear-view mirror, which is positioned inside the vehicle, displays an image of the area to the rear of the vehicle in terms of real distance. According to the invention, the rear-view mirror is articulated with the left mirror which displays the real distance of the external right-hand side area, thereby ensuring safety. It is important to note that the technical-industrial process used to develop the aforementioned dual mirror retains the same technical production principles used in the automotive field since the invention makes use of PVC injection and molding processes and the huge variety of features offered by plastic materials in this sector for use in structures and joints which are pressure mounted for the above purpose.

20 Claims, 7 Drawing Sheets

REAR-VIEW MIRROR FOR IMPROVING A DRIVER'S VISION IN A CAR OR MOTOR VEHICLE

FIELD OF THE INVENTION

The created rear-view mirror represents an advantage over the current ones by presenting two mirrors with a PVC structure, which are preferably of the same measure, they are joined by a PVC articulation allowing to perform lateral and frontal movements from the interior of the vehicle to be able to see the rear zone and the right rear lateral external zone, with respect to the vehicle.

BACKGROUND

In general, this rear-view mirror considers the interaction MAN-AUTOMEDIA-SURROUNDING ENVIRONMENT and aims to avoid the typical drawbacks in the traditional rear-view mirrors: When using traditional rear-view mirrors, the driver loses the frontal vision when he turns the head to see the external mirror at the right side.

SUMMARY

This innovation proposes to have two mirrors of the same measure joined in a way such as a pair of eyeglasses. The two joined mirrors provide separate vision of the surrounding perspective in the rear zone and the right rear lateral external zone while occupying half of the width of the windshield's upper zone (P) in the driver's side.

The coupling between the two mirrors is made by means of a PVC hinge formed by two spheres and an axis placed in the interior of the PVC structure of every mirror allowing to make the rotation movement to adapt it to the visual height of the driver who, from the interior of the vehicle will be able to set by means of the left mirror preferably, evident by means of a yellow frame, the side of the right external surrounding area while the right mirror effects the same function as the conventional rear-view mirrors.

The insertion of the mirrors in the PVC structure will be achieved by means of warming to be able to expand the plastic and using pressure to insert the mirrors The installation of the mirrors on the windshield will be by means of a cylinder having a sphere in its interior which is articulated by an axis with the other sphere inside the structure of the mirror so as to allow movement in frontal and side directions; the double mirror will be fixed with transparent silicon in the windshield as it is done at present in the rear-view mirrors.

This innovative accessory allows to use two mirrors divided by means of the hinge and the frame of the left mirror in yellow color, applying the same principle as the international norms which gives to this color the function to prevent on danger, achieving to divide in this way two zones corresponding to the rear zone and rear right zone from the interior of the vehicle, without losing the frontal vision. The same principle of the duplicity of the mirrors can be extended by making suitable modifications to the assembly and dimensions in accordance with the diversity of existing vehicles as: motor motorcycle, Motorini, truck bus, pullman, etc.

Thanks to the present innovation the before mentioned loss of frontal visibility problem is eliminated because of the driver has the double mirror at the interior of the vehicle, avoiding turning the head; the driver can set it at his visual height and it can be adapted to the dimension of the automobile with an ideal visibility from 15° to 60° without losing the frontal vision and obtaining the perception of the real distance between his transportation means and the ones surrounding the right rear external side remaining unaltered the function of the right rear-view mirror.

The international norm states that the side mirror generally located on the right external side of the transportation means; "The reflected images are actually closer than they appear" while in the present rear-view mirror the reflected images appear at the real distance.

The design of the double mirror also allows eliminating the solar reflex replacing the function of the fin or visor against the straight-ahead sun and it can be used at the top left part respective to the driver.

These and other advantages are typical of this innovative accessory and they will be better appreciated by the skilled tecnicisians in this field thanks to the description of the attached drawings annexed to this description in a simplified way although not limitative in the design.

DETAILED DESCRIPTION OF THE INVENTION

Figure 1:
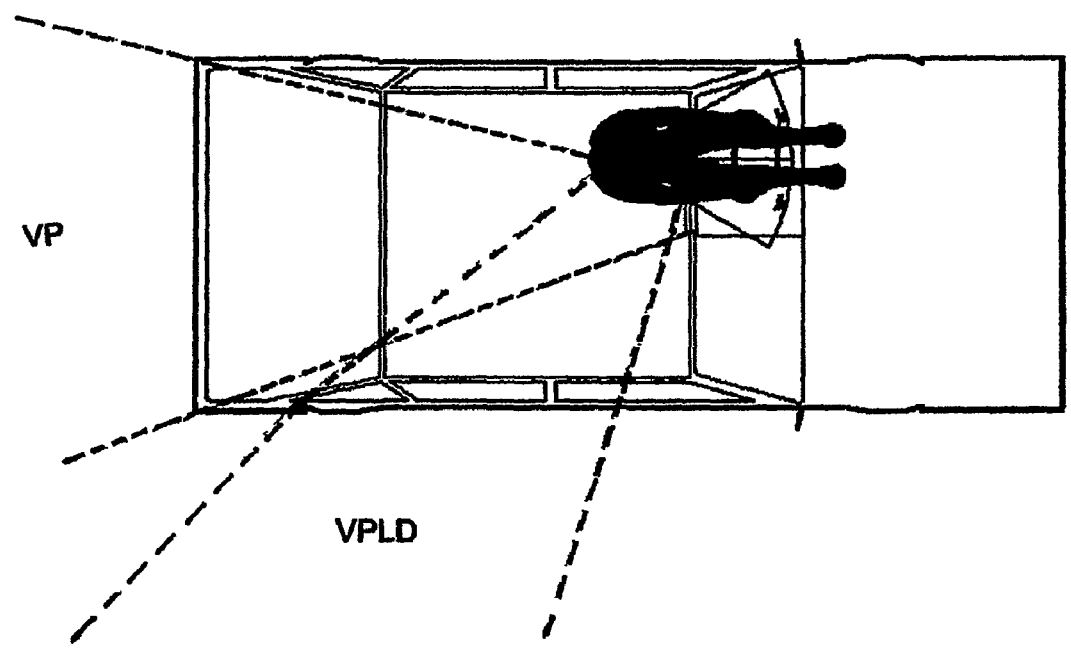
FIG. 1 shows the visual zones in two mirrors from the interior of the automobile.

FIG. 1 shows the visual zones in two mirrors from the interior of the automobile, rear-view (VP) and right side rear-view (VPLD).

Figure 2:
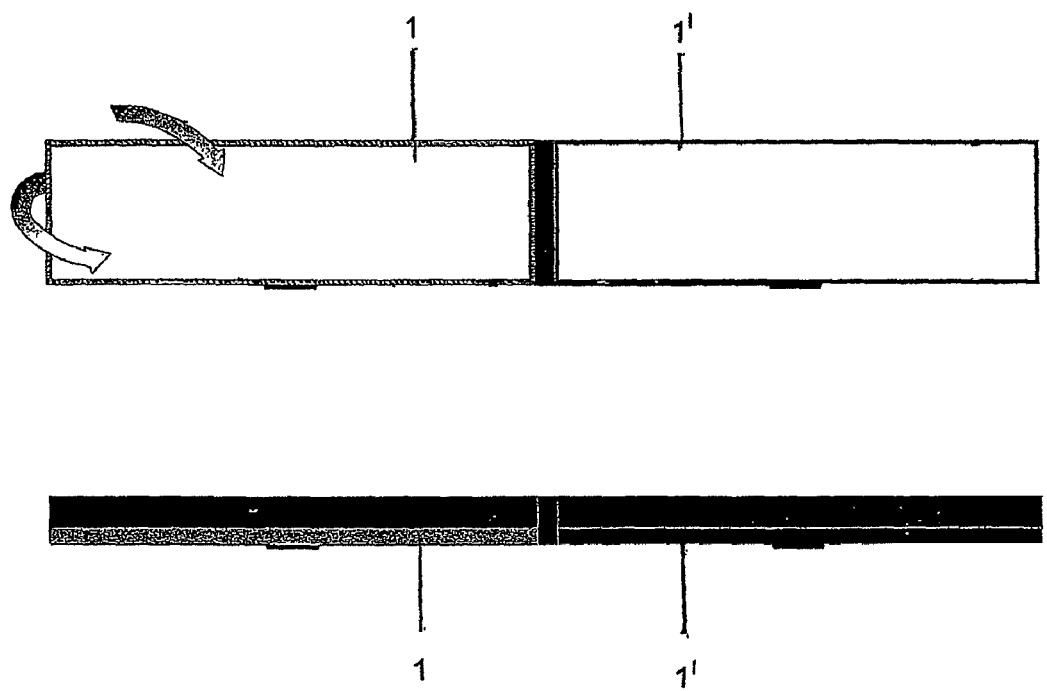
FIG. 2 represents the essence of the mirror seen straight ahead and the top part thereof.

FIG. 2 represents the essence of the mirror seen straight ahead and the top part thereof. The arrows indicate the frontal and side movements.

Figure 3:
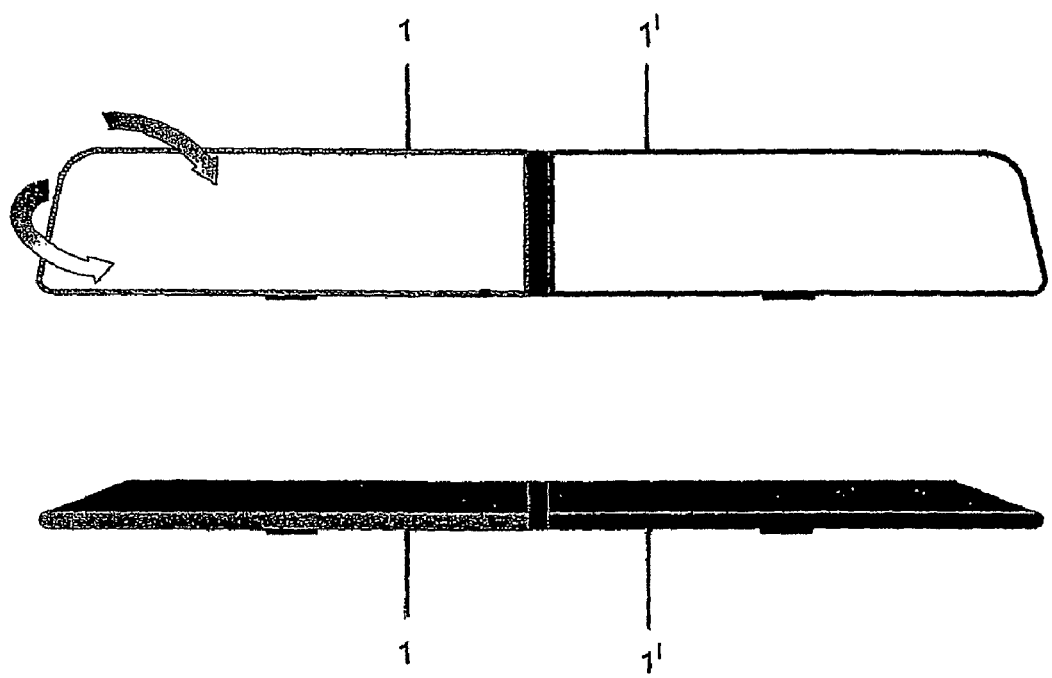
FIG. 3 indicates an embodiment of the external structure.

FIG. 3 indicates an embodiment of the external structure.

Figure 4:
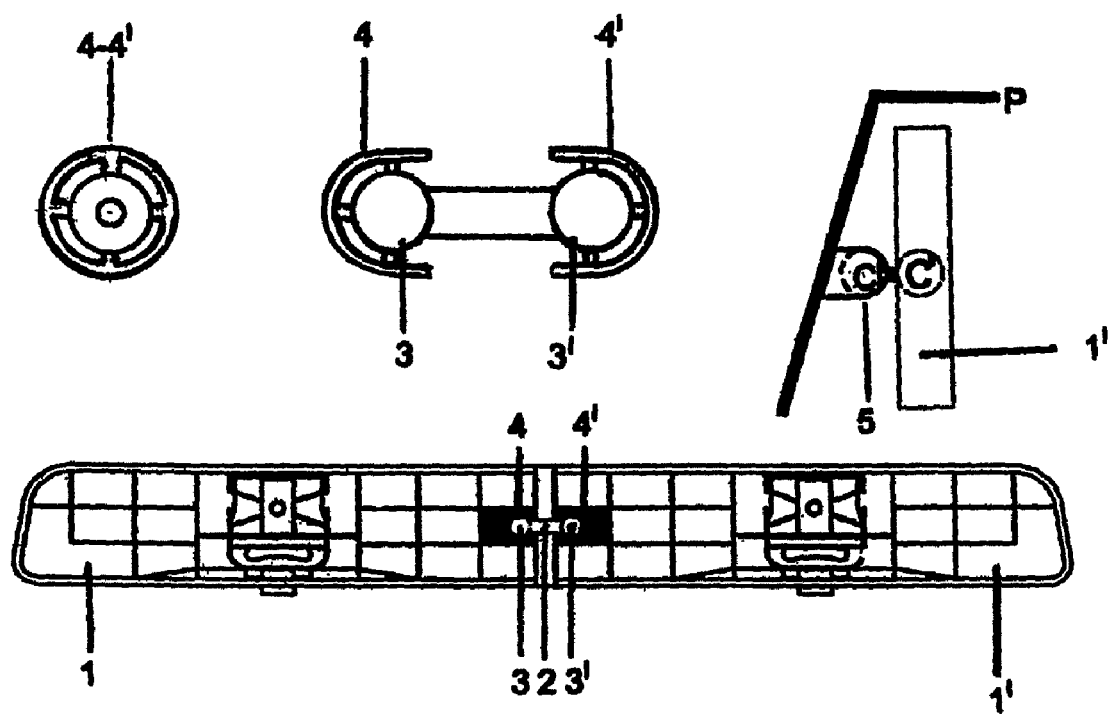
FIG. 4 shows the framework.

FIG. 4 shows the framework made in PVC (1-1'). The PVC hinge for assembling (2) is formed by an axis crossing the central structure and joins the frameworks (1-1') of the two mirrors by means of two spheres one in every end (3-3') housed at their corresponding cavity (4-4') disposed in every framework (1-1'); this hinge allows achieving rotation of each of two mirrors in the central part of the device, that is to say in the part between two frameworks (1-1'), as the driver decides to adapt it.

The PVC hinge (5) has the same structure as current rear-view mirrors, that is a cylinder cut on a side drawing an inclination as the windshield (P) and two opposite spheres (C-C') one sphere (C') is housed under pressure in the cut cylinder, and the other sphere (C) is inserted by pressure; only in the rear part of one of the frameworks (1-1') for example in framework 1'. The hinge 5 helps to fix it to the interior of the windshield.

Figure 5:
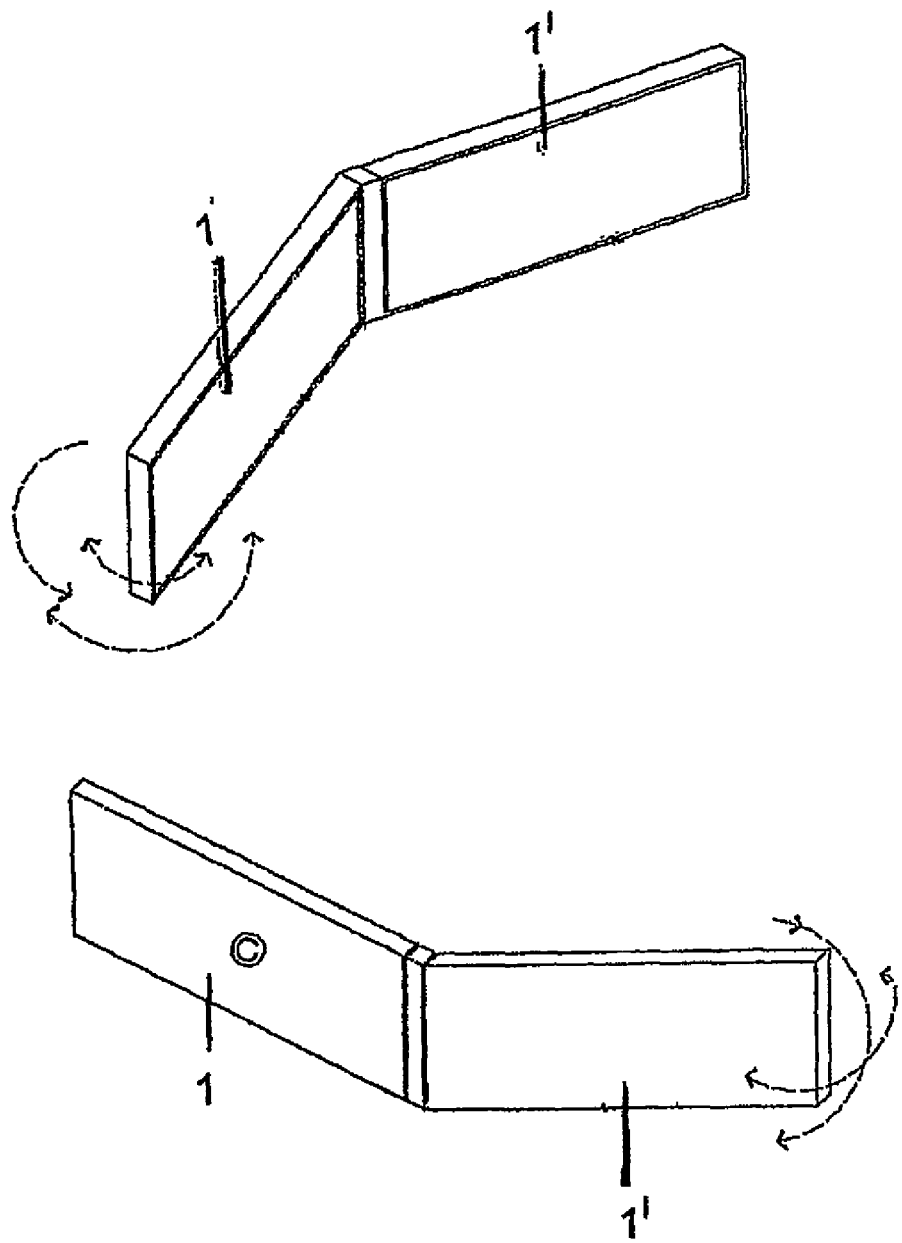
FIGS. 5 and 6 represent two embodiments of the mirror.
Figure 6:
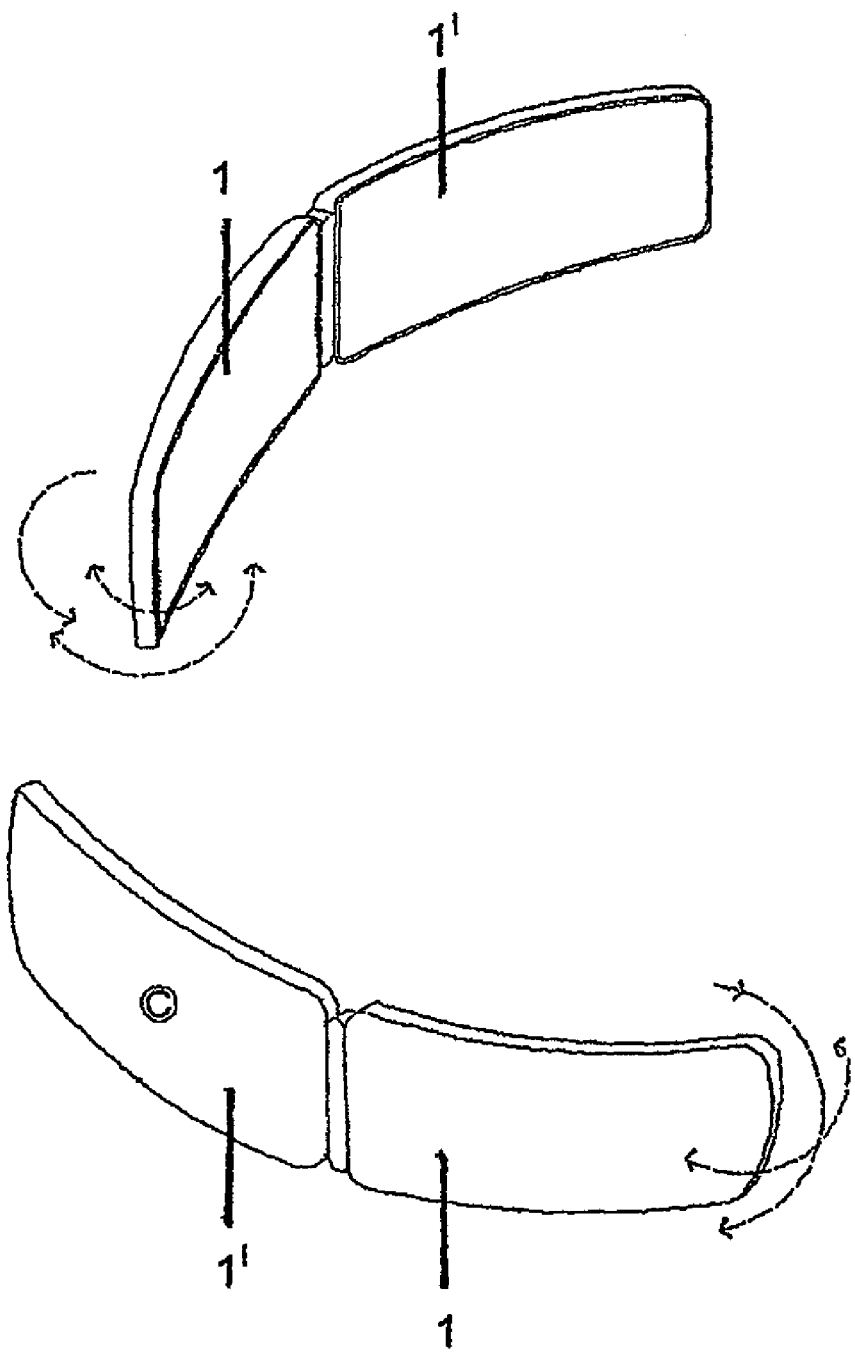

FIGS. 5 and 6 represent two embodiments of the mirror, one showing a flat framework (1-1') and the other one a hollow framework (1-1') that always follow the same principle. The structure can also change according to the automobile design.

Figure 7:
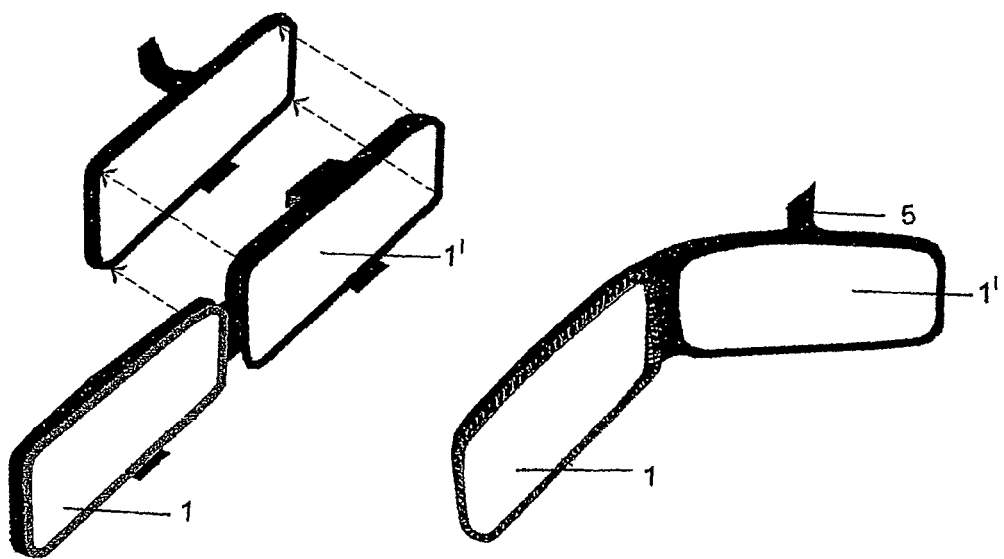
FIG. 7 shows the mirror that can be offered in two embodiments.

FIG. 7 shows the mirror that can offered in two embodiments, one as a finished innovation or as an addition to an existing rear-view mirror having a frame fixed by pressure framing the mirror with the framework (1') thereby obtaining the rear real visibility (VP triangle); with the mirror of the framework (1) visibility of the right rear side VPLD is achieved (see FIG. 1). Hinges (3-3'-C) allow regulating the system previously described as desired based on the visual height of the driver and the design of the vehicle. In the practice a skilled technician can make changes in an equivalent way to the form, dimension, disposition of the singular elements and nature of the materials used without getting apart from the aim of the adopted innovative concept, that is to say, remaining within the limits of the protection of present patent.

The invention claimed is:

1. An interior rear-view mirror comprising:
    a plurality of support frameworks;
    a mirror arranged in and associated with each of the plurality of support frameworks;
    a plurality of joints, each one of the plurality of joints being arranged in each of said plurality of support frameworks, said plurality of joints being configured to move about a plurality of axes with respect to one another;
    a connector arranged between and connected to the plurality of joints to mechanically fasten the plurality of support frameworks together,
    wherein one of the plurality of support frameworks and the associated mirror are configured to one of replace and cover an existing rear-view mirror.

2. The rear-view mirror according to claim 1 wherein the plurality of joints each comprise a sphere and a corresponding spherical cavity arranged and associated with each of the plurality of support frameworks.

3. The rear-view mirror according to claim 2 wherein the joints and connector are arranged along an axis.

4. The rear-view mirror according to claim 3 wherein the axis is in a vertically central position with respect to the plurality of frameworks.

5. The rear-view mirror according to claim 1 wherein at least one of said frameworks is configured to attach to an inner surface of a vehicle windshield.

6. The rear-view mirror according to claim 1 wherein at least one of said frameworks is configured to be attached to and arranged over a pre-existing rear view mirror.

7. The rear-view mirror according to claim 1 wherein the plurality of connectors comprise PVC.

8. The rear-view mirror according to claim 1 wherein each the mirrors and associated support frameworks have substantially the same dimensions.

9. The rear-view mirror according to claim 1 wherein one of the plurality of support frameworks and the associated mirror are configured to provide a driver with a rear view.

10. The rear-view mirror according to claim 1 wherein one of the plurality of support frameworks and the associated mirror are configured to provide a driver with a rear side view.

11. The rear-view mirror according to claim 1 wherein the plurality of support frameworks comprises only two frameworks; the first of the two frameworks is configured to be arranged centrally horizontally with respect to the windshield, the second of the two frameworks is configured to extend from the first of the two frameworks horizontally toward a driver side.

12. The rear-view mirror according to claim 1 wherein at least one of the plurality of support frameworks is brightly colored.

13. An interior rear-view mirror comprising:
    a plurality of support frameworks, each of the frameworks including a front side, a back side opposing the front side, two vertical sides, a top side, and a bottom side;
    a mirror arranged in and associated in the front side of each of the plurality of support frameworks;
    a plurality of joints, each one of the plurality of joints being arranged in one of the vertical sides of each of said plurality of support frameworks, said plurality of joints being configured to move about a plurality of axes with respect to one another;
    a connector arranged between and connected to the plurality of joints to mechanically fasten the plurality of support frameworks together, the connector extending into one of the vertical sides of each of the plurality of support frameworks;
    wherein the plurality of joints each comprise a sphere and a corresponding spherical cavity arranged and associated with each of the plurality of support frameworks;
    wherein one of the plurality of support frameworks and the associated mirror are configured to provide a driver with a rear view; and
    wherein another one of the plurality of support frameworks and the associated mirror are configured to provide a driver with a rear side view.

14. The rear-view mirror according to claim 13 wherein the plurality of support frameworks comprises only two frameworks; the first of the two frameworks is configured to be arranged centrally horizontally with respect to the windshield, the second of the two frameworks is configured to extend from the first of the two frameworks horizontally toward the driver.

15. The rear-view mirror according to claim 13 wherein at least one of the plurality of support frameworks is brightly colored.

16. The rear-view mirror according to claim 13 wherein the joints and connector are arranged along an axis and the axis is in a vertically central position with respect to the plurality of frameworks.

17. The rear-view mirror according to claim 13 wherein each the mirrors and associated support frameworks have substantially the same dimensions.

18. The rear-view mirror according to claim 13 wherein at least one of said frameworks is configured to one of attach to an inner surface of a vehicle windshield and be attached to and arranged over a pre-existing rear view mirror.

19. The rear-view mirror according to claim 13 wherein one of the plurality of support frameworks and the associated mirror are configured to provide a driver with a rear view; and wherein another one of the plurality of support frameworks and the associated mirror are configured to provide a driver with a rear side view.

20. An interior rear-view mirror comprising:
    a plurality of support frameworks, each of the frameworks including a front side, a back side opposing the front side, two vertical sides, a top side, and a bottom side;
    a mirror arranged in and associated in the front side of each of the plurality of support frameworks;
    a plurality of joints, each one of the plurality of joints being arranged in an aperture in one of the vertical sides of each of said plurality of support frameworks such that there are two apertures opposing each other with one of the two apertures in the vertical side of one of the plurality of support frameworks and the other one of the two apertures and other one of the vertical sides of the other one of the plurality of support frameworks, said plurality of joints being configured to move about a plurality of axes with respect to one another;
    a connector arranged between and connected to the plurality of joints to mechanically fasten the plurality of support frameworks together, the connector extending into each of the two apertures;

wherein the plurality of joints each comprise a sphere and a corresponding spherical cavity arranged in the aperture and associated with each of the plurality of support frameworks;

wherein one of the plurality of support frameworks and the associated mirror are configured to provide a driver with a rear view; and wherein another one of the plurality of support frameworks and the associated mirror are configured to provide a driver with a rear side view.

\* \* \* \* \*